United States Patent [19]

Sato

[11] Patent Number: 5,331,433
[45] Date of Patent: Jul. 19, 1994

[54] IMAGE READER

[75] Inventor: Masaaki Sato, Kanagawa, Japan

[73] Assignee: Fuji Xerox Co., Ltd., Tokyo, Japan

[21] Appl. No.: 863,121

[22] Filed: Apr. 3, 1992

[30] Foreign Application Priority Data

Apr. 5, 1991 [JP] Japan .................. 3-073245

[51] Int. Cl.5 ........................... G03G 15/00
[52] U.S. Cl. .................... 358/471; 358/483;
358/298; 358/461; 355/229
[58] Field of Search ............... 358/471, 475, 360, 406,
358/80, 300, 75, 80, 483, 213.28, 494, 451, 465,
466, 298; 355/208, 69, 30, 229, 246; 346/160,
157

[56] References Cited

U.S. PATENT DOCUMENTS

| | | | |
|---|---|---|---|
| 4,849,820 | 7/1989 | Suzuki et al. | 358/483 |
| 4,853,739 | 8/1989 | Miyamoto et al. | 355/229 |
| 4,870,454 | 9/1989 | Kurusu et al. | 355/69 |
| 4,939,541 | 7/1990 | Sugiura | 355/202 |
| 5,023,626 | 6/1991 | Kawamura | 346/33 TP |
| 5,142,356 | 8/1992 | Usami et al. | 358/80 |
| 5,153,929 | 10/1992 | Itagaki | 382/65 |
| 5,166,699 | 11/1992 | Yano et al. | 346/1.1 |
| 5,181,118 | 1/1993 | Kimura | 358/461 X |
| 5,189,441 | 2/1993 | Fukui et al. | 358/298 |
| 5,212,560 | 5/1993 | Hattori et al. | 358/360 |

Primary Examiner—Paul Ip
Attorney, Agent, or Firm—Finnegan, Henderson, Farabow, Garrett & Dunner

[57] ABSTRACT

An image reader that uses a fluorescent lamp as a light source and that corrects colors in accordance with quantities of light reflected from a reference white plate prior to scanning a document. A relationship between a tube wall temperature of the fluorescent lamp and a quantity of light which have been measured in advance is stored in a RAM, and an AGC circuit for controlling gain of a color sensor in accordance with the temperature detected by a temperature sensor is provided, or the tube current of the fluorescent lamp in accordance with the temperature detected by the temperature sensor is controlled so that the quantity of light of the fluorescent lamp can be maintained constant.

2 Claims, 7 Drawing Sheets

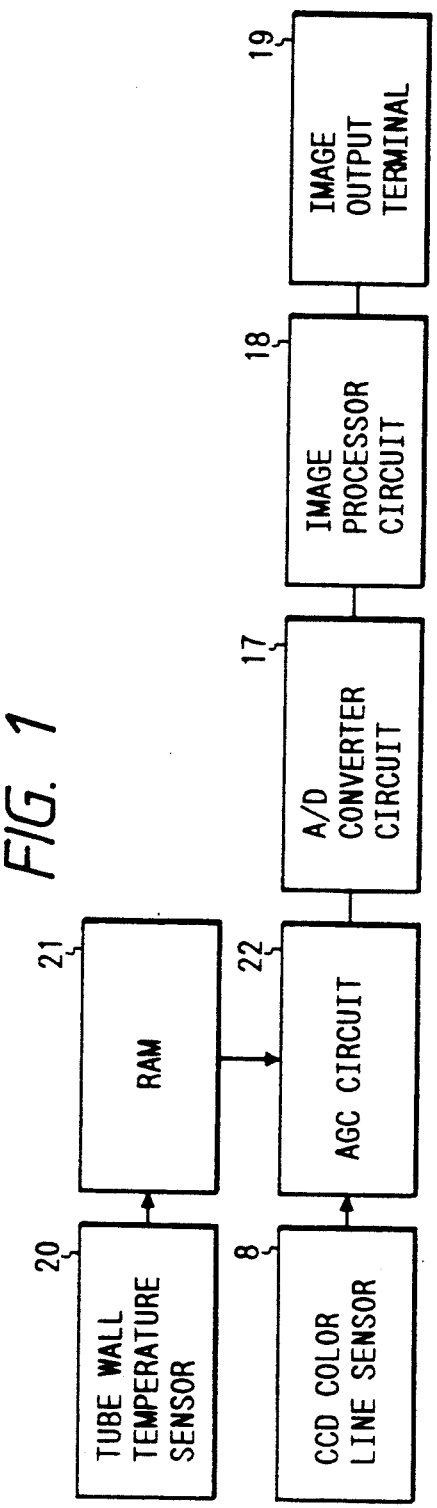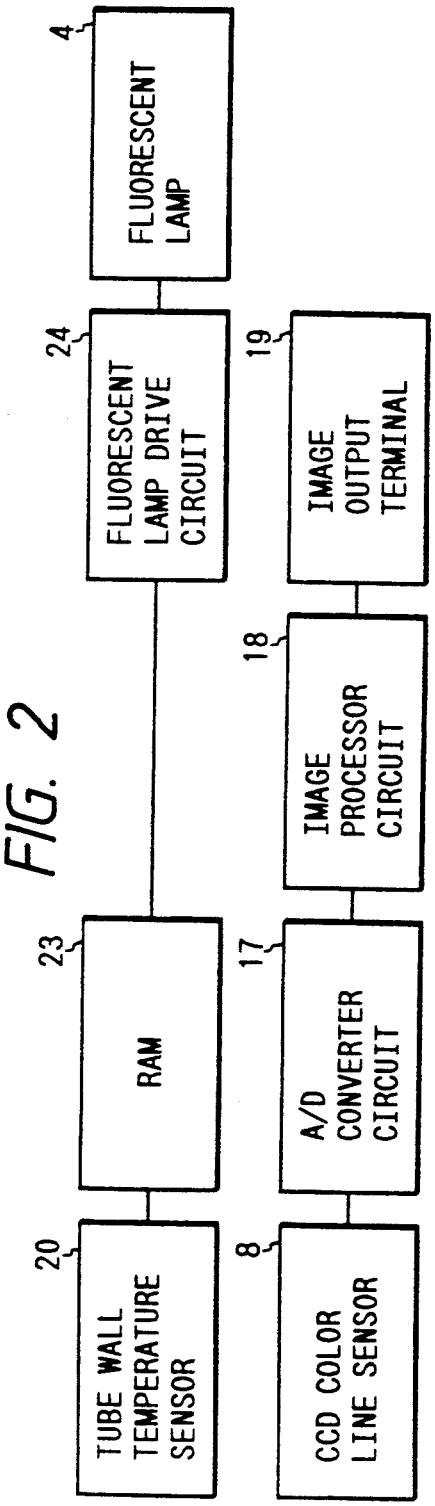

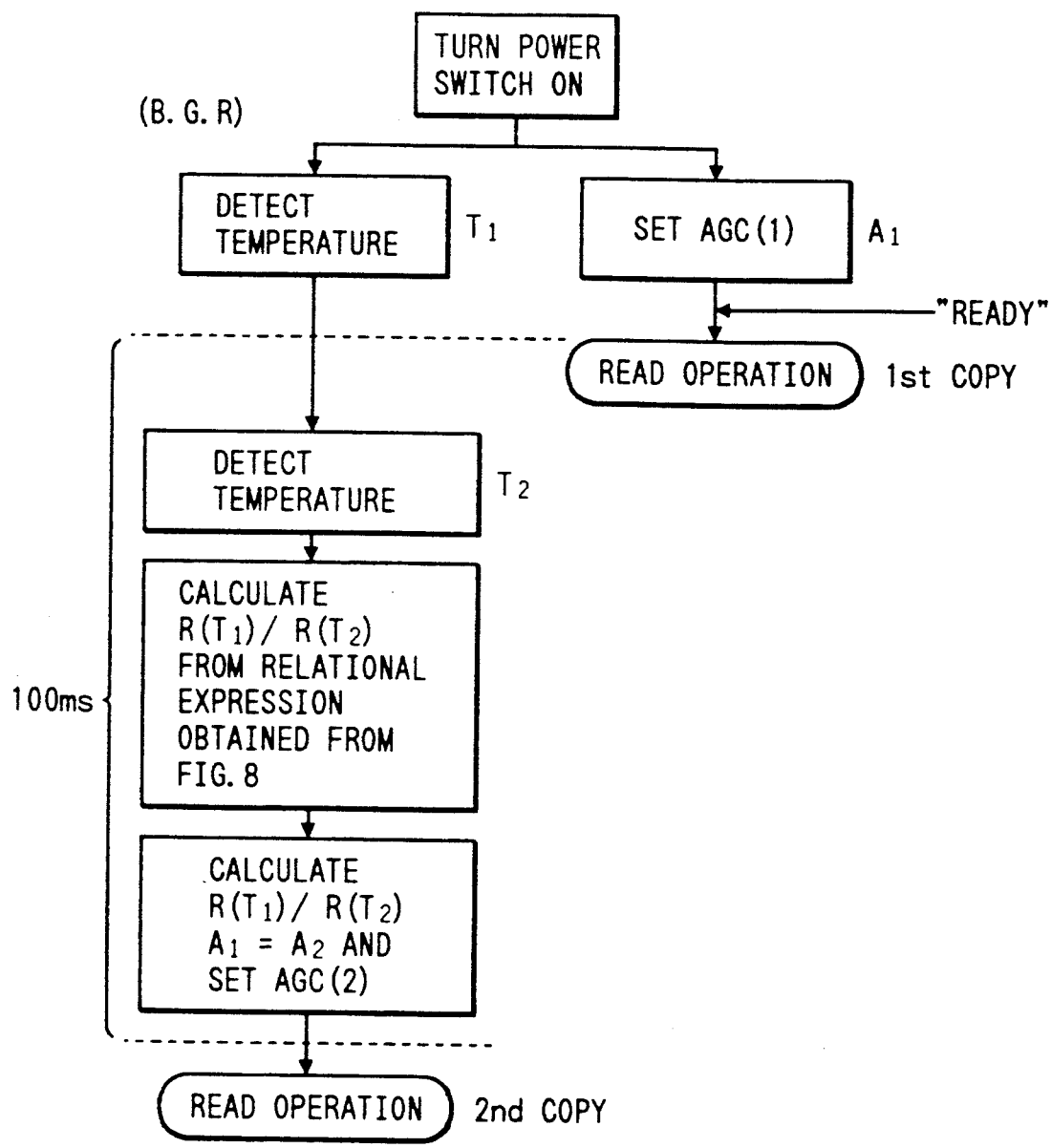

IMAGE READER

BACKGROUND OF THE INVENTION

The invention relates to an image reader that causes an image reading optical system including a color reading sensor to scan a document region.

An exemplary image reader including a color reading sensor is shown in FIG. 4. In FIG. 4, reference numeral 1 designates an image reader unit; 1a, a housing thereof; 2, a document; 3, a platen glass; 4, a fluorescent lamp; 5, a reflecting mirror; 6, a rod lens array; 7, a filter; 8, a CCD (charge-coupled device) color line sensor; 8a, a connecting member; 9, a circuit board; 10, a lamp heater; 11, a control signal flexible cable; 12, an illumination power supply flexible cable; 13, a radiation plate; 13a, a projecting portion; 14, an electromagnetic shield punching drive; 15, an IC (integrated circuit) chip; and 16, a reference white plate.

FIG. 5 is an electric block diagram of the image reader. An optical output from a document read by the sensor 8 is converted into a digital signal by an A/D converter circuit 17, and the digital signal is then applied to an image output terminal 19 through an image processor circuit 18.

If the fluorescent lamp 4 is used as a light source in such an image reader, an image reader having the characteristics that the warmup time is short and that the lamp heater power is set to a low value because the optical output is temperature-dependent and must start copying even if the lamp tube wall temperature is still low and has not yet reached an optimal temperature. If the image reader starts a continuous copying operation at this point, the lamp tube wall temperature rises due to heating by itself with the lamp being turned on, thus causing fluctuations of the quantity of light.

A lamp tube wall temperature rising characteristic at 10° C. is shown in FIG. 6. It is assumed here that the lamp heater power cannot be increased and that the warmup time must be one minute. FIG. 6 shows an operation sequence of an image reader, a solid line indicating a nominal condition and broken lines including an upper and lower limits of an acceptable tolerance. This image reader exhibits a characteristic that the heater temperature is risen to 37° C. under the nominal condition; that the heater is turned off upon turning the lamp on at 37° C.; and an AGC/AOC operation is started upon turning the lamp off after 55 seconds. Further, the control temperature during standby is 50° C.

With the characteristic shown in FIG. 6, to satisfy the one-minute warmup time, the lamp must be turned on at about 19° C. and a copying operation is then started under the condition of the nominal heater power (the solid line). As a result, the fluctuations in the quantity of light, such as shown in FIG. 7, are observed, i.e., the quantity of light changes noticeably while making initial 10 copies or performing 40 scanning operations. The reason is that the optical output of the fluorescent lamp depends on the temperature and has the characteristic shown in FIG. 8.

In FIG. 8, the optical output of the fluorescent lamp peaks with the tube wall being at 45° to 50° C., and decreases with decreasing temperature. Assuming that its peak output is 100%, then the optical output at 19° C. becomes about 40% of the peak value. If the copying operation is performed continuously under this condition, the tube wall temperature of the fluorescent lamp changes drastically, thus causing the conspicuous fluctuations in the quantity of light, as shown in FIG. 7.

In the case of the image reader, a sensor output of the CCD color line sensor 8 with respect to the reference white plate 16 is monitored, and an analog gain must be set before A/D conversion at the A/D converter circuit 17 (see FIG. 5) that comes after sensing by the sensor. This operation is called "AGC," and the normal operation sequence is that AGC is effected before the image reader becomes ready to start copying (READY).

Let us take the case shown in FIG. 7 as an example and assume that AGC is effected after the lamp has been turned on during warmup. This timing corresponds to the zero copy state in FIG. 7. Assuming that the quantity of light is 100% at this timing, as the continuous copying operation is proceeded, the quantity of light increases to a level of as much as 250%. This makes AGC useless and the increase in the quantity of light causes the AGC set value to overflow (either the output of the amplifier or the output of the A/D converter becomes saturated).

Consequently, a normal reproduction characteristic such as $D_{OUT}$ shown in FIG. 9 cannot be obtained, producing a very low-quality image whose low-density portion is not well reproduced as shown in FIG. 10.

SUMMARY OF THE INVENTION

An object of the invention is to prevent the above-mentioned reduction in the tone levels of read data by correcting an AGC set value while taking into consideration the characteristic of a fluorescent lamp.

A first aspect of the invention is applied to an image reader using a fluorescent lamp as a light source and correcting colors in accordance with quantities of light reflected from a reference white plate before scanning a document. Such an image reader includes a temperature sensor for monitoring the tube wall temperature of the fluorescent lamp and means for controlling the gain of a color sensor in accordance with the temperature sensed by the temperature sensor and based on the relationship between a tube wall temperature and a quantity of light, the tube wall temperature and the quantity of light being measured in advance.

A second aspect of the invention is applied to an image reader using a fluorescent lamp as a light source and correcting colors in accordance with quantities of light reflected from a reference white plate before scanning a document and this image reader includes a temperature sensor for monitoring the tube wall temperature of the fluorescent lamp and means for controlling the tube current of the fluorescent lamp in accordance with the temperature sensed by the temperature sensor and based on the relationship between a tube wall temperature and a quantity of light which have been measured in advance, so that the quantity of light from the fluorescent lamp becomes constant.

With the above construction, the invention is designed to obtain a constant output level by storing the relationship between the temperature and the optical output in the RAM (random access memory), correcting the set value of the gain at the AGC circuit in accordance with the fluorescent lamp tube wall temperature sent from the tube wall temperature sensor, and then applying the corrected value to the A/D converter circuit.

Alternatively, according to the present invention, the fluorescent lamp tube wall temperature is detected by the tube wall temperature sensor, relational expressions obtained from the relationships among the temperature, the quantity of light, and the tube current in the RAM in advance, and such a tube current as to make the quantity of light, i.e., the sensor output, constant is applied to the fluorescent lamp by a fluorescent lamp drive circuit.

BRIEF DESCRIPTION OF THE DRAWINGS

FIG. 1 is a block diagram showing a configuration of a first embodiment of the invention;

FIG. 2 is a block diagram showing a configuration of a second embodiment of the invention;

FIG. 3 is a flowchart showing a process of the first embodiment of the invention;

FIG. 6 is a graph showing a change in the tube wall temperature of a fluorescent lamp from when a power source has been turned on;

DETAILED DESCRIPTION OF THE PREFERRED EMBODIMENTS

Figure 4:
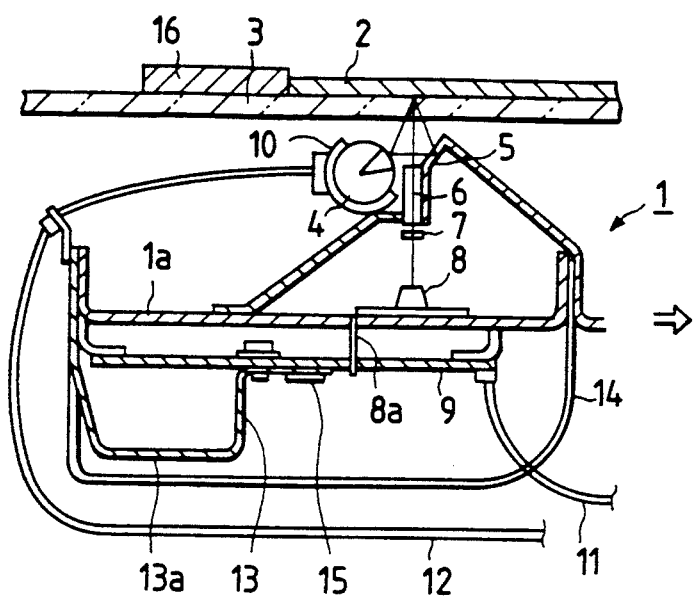
FIG. 4 is a diagram showing an exemplary document reader.
Figure 5:
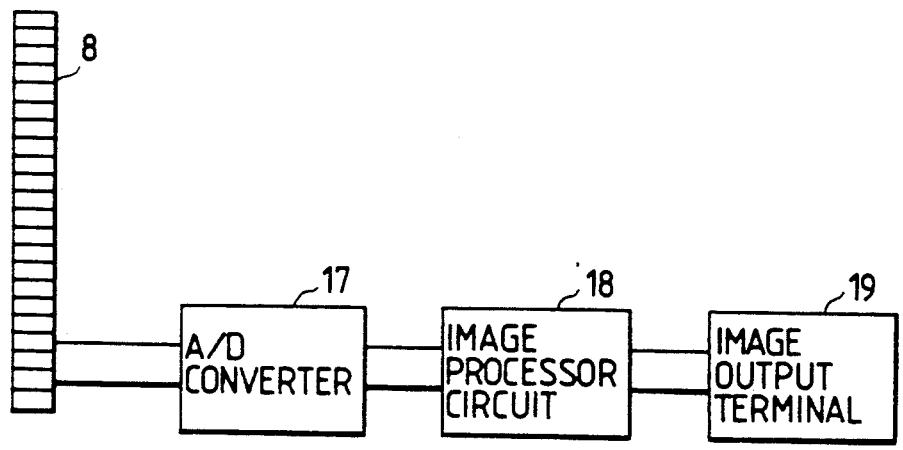
FIG. 5 is a block diagram showing an exemplary conventional image processing circuit.
Figure 6:
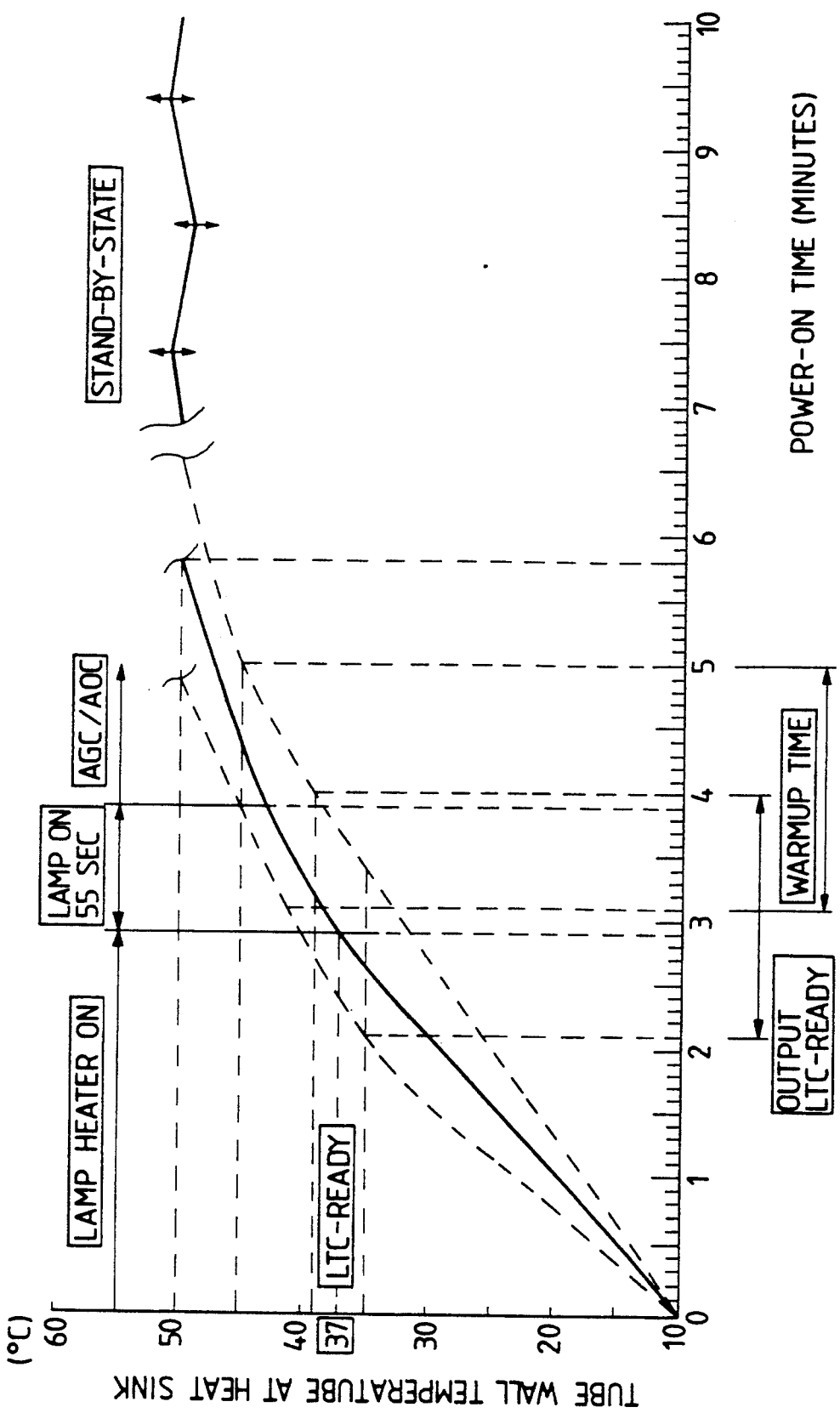
Figure 7:
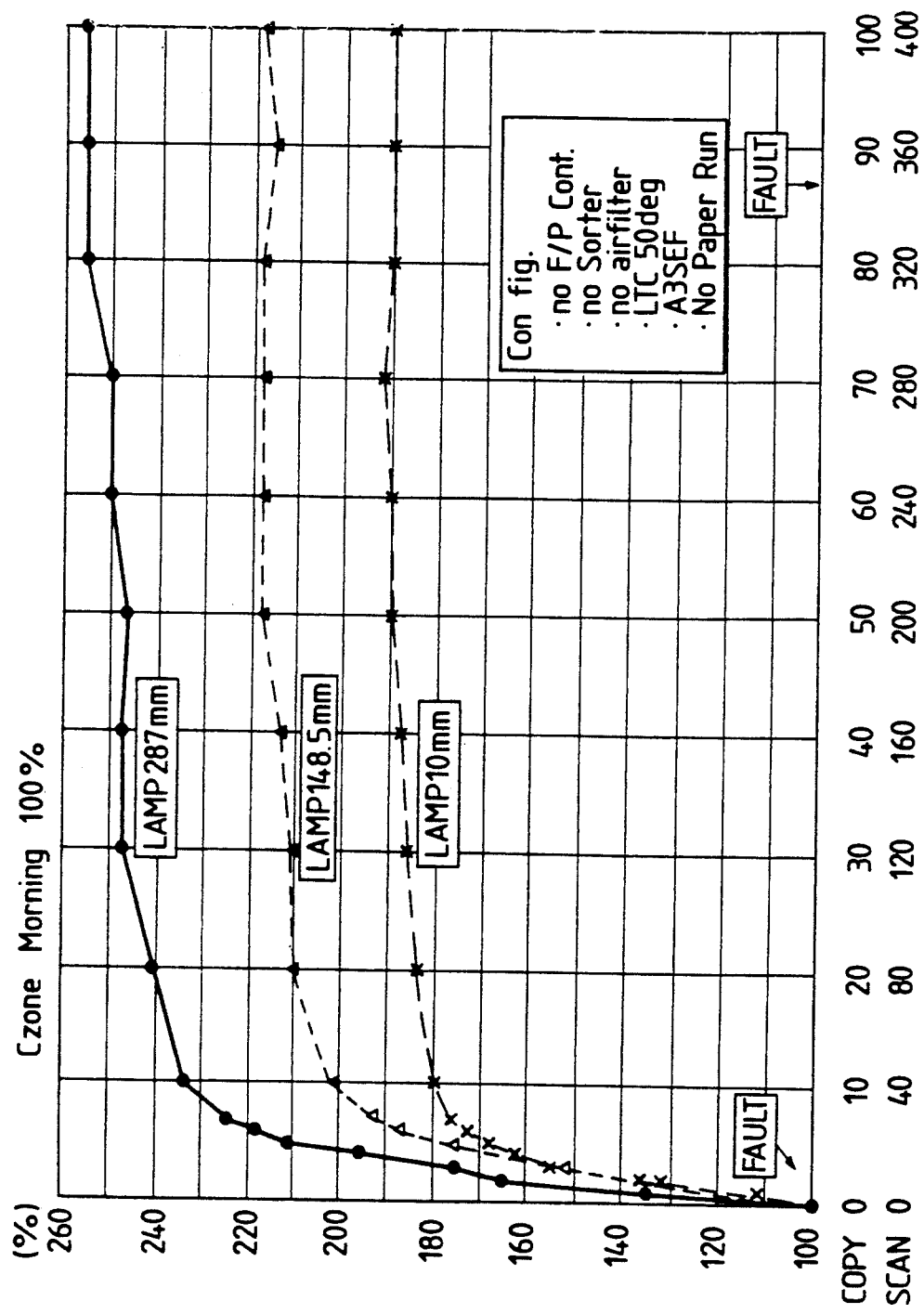
FIG. 7 is a graph showing a change in optical output as a function of a copying or a scanning frequency of various types of lamps.
Figure 8:
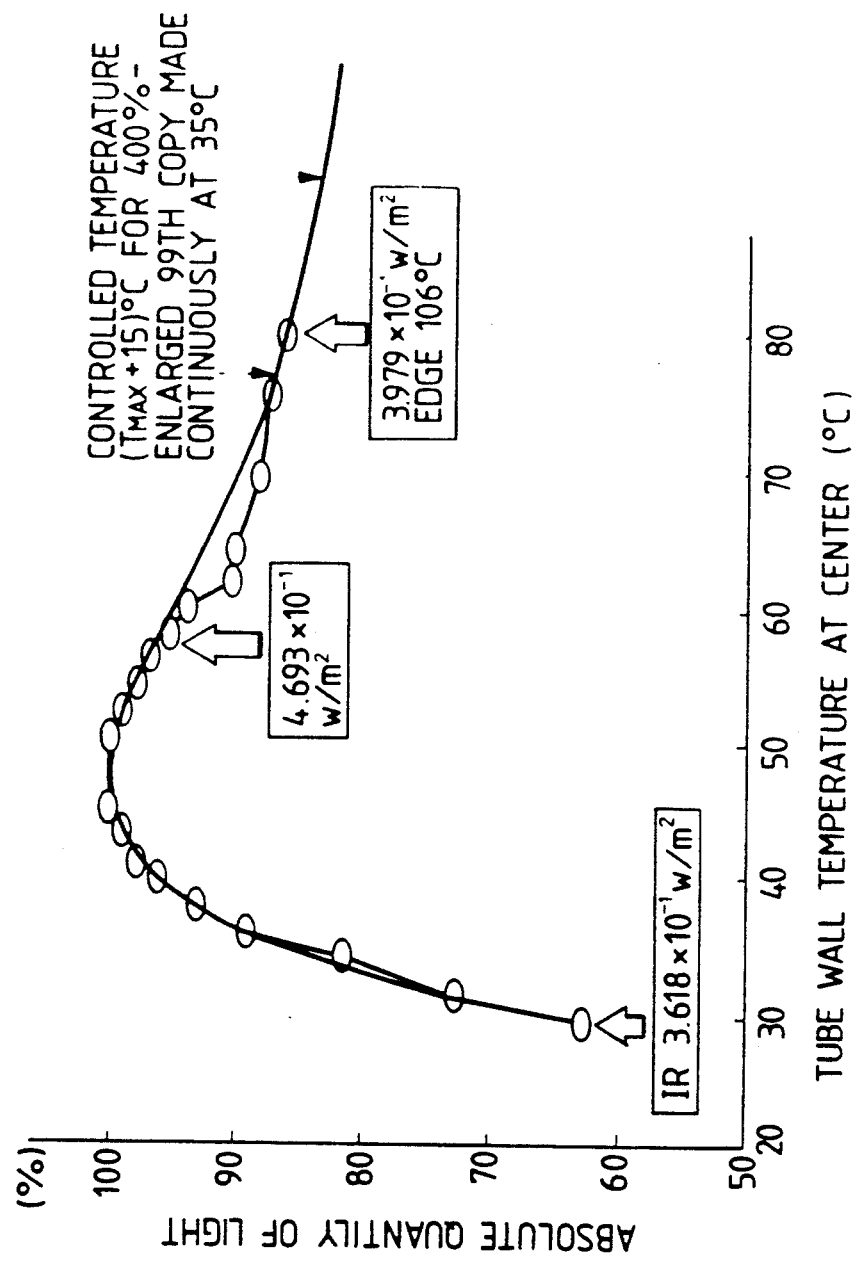
FIG. 8 is a graph showing a change in the quantity of light as a function of the tube wall temperature.

The invention will be described specifically with reference to embodiments thereof. FIG. 1 shows a first embodiment of the invention. Reference numeral 8 designates a CCD (charge-coupled device) color line sensor; 22, an AGC circuit; 20, a tube wall temperature sensor for a fluorescent lamp; and 21, a RAM (random access memory) for storing a relationship between a temperature and an optical output. FIG. 3 is a flowchart for the first embodiment. In FIG. 3, upon turning the power on, a tube wall temperature $T_1$ of the fluorescent lamp 4 is sensed by the tube wall temperature sensor 20, and a gain $A_1$ of the AGC circuit 22 is set. A first copy is made with the gain $A_1$. A second copy is made by following the steps of sensing the tube wall temperature $T_2$ of the fluorescent lamp 4 at the time of starting the copying operation, calculating $R(T_1)/R(T_2)$ from a relational expression obtained from FIG. 8 prestored in the RAM, calculating $A_2 = A_1 \times R(T_1)/R(T_2)$ as the gain of the AGC circuit 22, and setting the calculated value to thereby cause the image reader to read data. A third copy and further copies will similarly follow the same steps of sensing the tube wall temperature at the start of copying and setting the calculated gain of the AGC.

Figure 11:
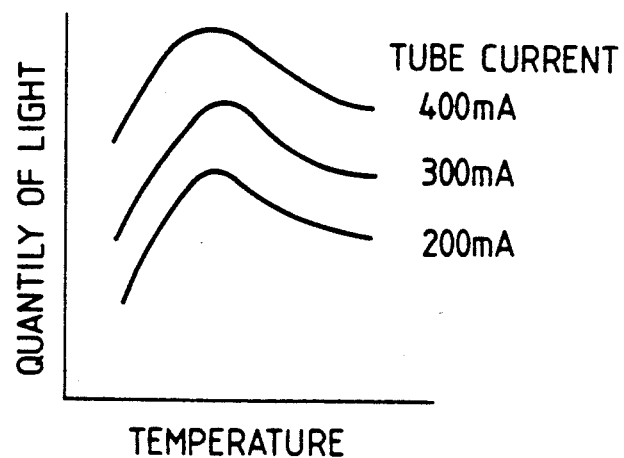
FIG. 11 is a graph showing a the relationships among the temperature, the quantity of light, and the tube current.

FIG. 2 shows a second embodiment of the invention. This embodiment involves the steps of storing in a RAM 23 the relational expressions obtained from FIG. 11 indicating the relationship among the three factors, such as the tube wall temperature, the quantity of light, and the tube current, monitoring the temperature of the fluorescent lamp 4 by the tube wall temperature sensor 20, and reading the tube current as to make the quantity of light at that temperature constant to thereby drive the fluorescent lamp 4 by the fluorescent lamp drive circuit 24.

Figure 9:
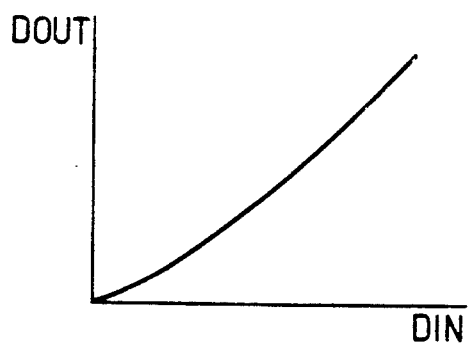
FIG. 9 is a graph showing a normal density reproduction characteristic.
Figure 10:
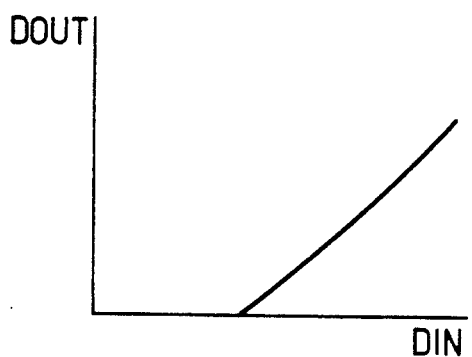
FIG. 10 is a graph showing a density reproduction characteristic during an abnormality.

As a result of these operations, a normal reproduction characteristic, such as shown in FIG. 9, can be obtained even if the image reader is in a low temperature environment, i.e., not yet heated.

As described in the foregoing pages, the present invention allows the warmup time of an image reader to be curtailed without increasing the heater power and maintains a stable image quality. Namely, in the present invention, the warmup time of the image reader is shortened without increasing the heater power. When the copying operation is performed continuously, the influence of the image fluctuation caused by the fluctuation in the quantity of light is therefore completely omitted.

What is claimed is:

1. An image reader, having a fluorescent lamp, for correcting colors in accordance with a quantity of light reflected from a reference white plate before scanning a document, said image reader comprising:

color sensor means for detecting colors of the document;

temperature sensor means for monitoring a tube wall temperature of said fluorescent lamp; and control means for controlling a gain of the color sensor means, wherein relationships between tube wall temperature and quantity of reflected light are determined in advance, and said control means applies said relationships to said tube wall temperature sensed by said temperature sensor means to control said gain of said color sensor means.

2. The image reader as claimed in claim 1, wherein said control means includes RAM means for storing said relationships between said tube wall temperature and quantity of reflected light.

* * * * *